United States Patent

Staar

[15] 3,677,493

[45] July 18, 1972

[54] AUTOMATIC STOP MECHANISM FOR A RECORDER USING MAGNETIC TAPE STORED IN A CASSETTE

[72] Inventor: Marcel Jules Helene Staar, Brussels, Belgium

[73] Assignee: Staar Development Co., Brussels, Belgium

[22] Filed: Feb. 16, 1971

[21] Appl. No.: 115,199

[30] Foreign Application Priority Data

Feb. 13, 1970 Belgium ..................................745964

[52] U.S. Cl. .................................242/191, 242/198, 274/4 F

[51] Int. Cl. .................B65h 59/38, G03b 1/02, G11b 15/13

[58] Field of Search ................................242/191–200, 186; 274/4 E, 4 F, 11 B, 11 C

[56] References Cited

UNITED STATES PATENTS

| | | | |
|---|---|---|---|
| 3,433,428 | 3/1969 | Schatteman | 242/191 |
| 3,528,013 | 6/1971 | Beretta | 242/186 |
| 3,617,066 | 11/1971 | Foelkel et al. | 274/4 F |

*Primary Examiner*—Leonard D. Christian
*Attorney*—Wolfe, Hubbard, Leydig, Voit & Osann

[57] ABSTRACT

A take-up reel drive control for tape recorders incorporating an automatic shut-off feature which utilizes the same motive force that drives the take up reel for actuating the automatic shut-off mechanism. Additionally, the same motive force can be used to bring the recording-playback elements, such as the payback head, into their inoperative position.

9 Claims, 7 Drawing Figures

INVENTOR
MARCEL JULES HELENE STAAR by: Wolfe, Hubbard, Leydig, Voit & Osann
ATTYS.

INVENTOR
MARCEL JULES HELENE STAAR by: Wolfe, Hubbard, Leydig, Voit & Osann
ATTYS.

AUTOMATIC STOP MECHANISM FOR A RECORDER USING MAGNETIC TAPE STORED IN A CASSETTE

This invention relates generally to tape transfer control mechanisms, and in particular to a take-up reel drive mechanism having an automatic stopping capability.

The invention is related most directly to magnetic tape recorder-playback units using cassette-type cartridges in which two spools or reels are provided for transfer and storage of the tape. With such units having capstan drive for the tape, the take-up reel is normally driven through a friction clutch or the like; since the speed of rotation of the tape take-up reel varies with the diameter of the tape build-up on the reel, the actual speed of movement of the tape past the playback head remaining constant. The speed difference between the motive force, or drive means, and the reel itself, is absorbed in the slippage of the friction clutch.

The two ends of the tape are attached to the reels; when all the tape has passed from one reel to the other the reels stop. In conventional recorders the stoppage of the tape results in greatly increased slippage in the friction clutch while the drive motor continues to run. The attendant disadvantages are increased tension on the tape itself, excessive wear and heat build up in the friction clutch and useless energy drain in the motor. It is, therefore, desirable to automatically disconnect the general supply from the recorder when the magnetic tape stops.

It is a primary object of the present invention to provide a take up reel control mechanism in which the energy source for the unit is disconnected when the tape is completely played and stopped, the disconnection being facilitated through the same mechanical drive elements which respond to the energy source to drive the reel during normal operation. A related object of the present invention is the provision of tape stoppage detection means encompassed in the mechanical reel drive elements themselves.

It is desirable to provide other mechanical activities when the tape transport is rendered inoperative, such as retraction of the playing head and pressure roller from the tape surface to allow for easy removal of the cassette.

Therefore, it is a further object of the present invention to provide for release of the tape from the operative elements of the transport through the motive force of the take-up reel drive in response to a stoppage of the tape.

Other objects and advantages of the invention will become apparent upon reading the attached detailed description and upon reference to the drawings in which.

While the invention has been described in connection with the preferred embodiments, I do not intend to limit the invention to the form set forth, but, on the contrary, I intend to cover the alternatives, modifications, and equivalents as may be included within the spirit and scope of the invention.

Figure 1:
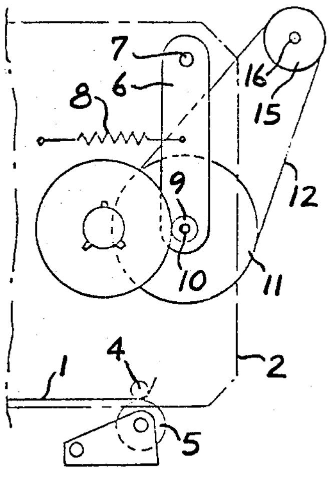
Fig. 1 (PRIOR ART)
FIG. 1 is a diagrammatic view of a take-up reel drive which is representative of conventional reel drives.

Turning now to FIG. 1, there is illustrated a conventional cassette take up drive for a magnetic tape 1 in a cassette 2, the tape being taken up and delivered respectively on a take-up reel 3 and a supply reel (not shown). The tape 1 is driven by a capstan 4 in cooperation with a pressure roller 5, the capstan being driven by a belt and roller combination (not shown). The take-up reel 3 is driven by reel drive elements selectively pivotable into engagement with the periphery of the reel 3, said drive elements being mounted on a lever arm 6 pivotable about a fixed spindle 7 biased toward the periphery of the reel 3 by a spring 8. The drive elements in this case include a roller 9 mounted on a spindle 10. The motive force for the drive elements is provided by a drive means including a pulley 11 rotated by a belt 12 driven by a pulley 15 fixed on the shaft 16 of a motor (not shown).

Figure 4:
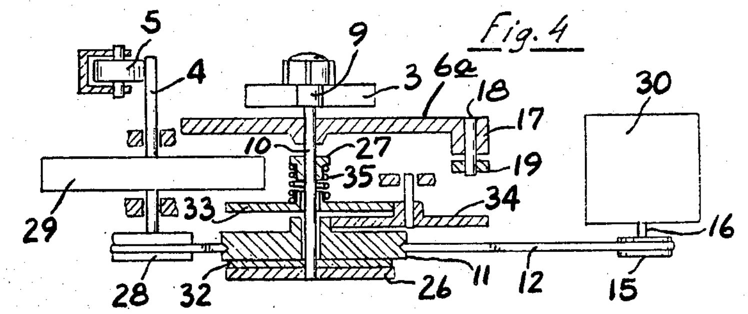
FIG. 4 is a sectional view of the take-up reel drive control shown in FIGS. 2 and 3.

Connection between the pulley 11 and the spindle 10 is effected through the agency of a friction clutch of the type described later in connection with FIG. 4. The friction clutch is operative to absorb the difference in speed between the pulley 11, which rotates at high speed as part of the drive means, and the reel 3, which is required to turn more slowly for normal operation of the reel at speeds which decrease as additional tape is wound on the reel. When the tape 1 has reached its end, the take-up reel 3 stops, but the pulley 11 continues to rotate as a result of slippage in the friction clutch. The speed of rotation of the reel 3 depends upon the amount of tape on the reel. Toward the end of the playback or record period, there is a considerable diameter of tape accumulated, the speed of the take-up reel is then relatively low, for example a fraction of a revolution per second, and the speed differential absorbed by the slippable clutch is very high. Only slightly higher is the speed differential which is absorbed by the slippable clutch when the reel comes to a stop at the end of the tape.

In accordance with the present invention, a take-up reel drive control system of the type described above is provided with an automatic stop mechanism which utilizes the direct energy of the drive means itself to disconnect the energy source from the drive means in response to a drop in speed of the reel drive elements and the reel itself by a predetermined amount below the speed of the drive means. This is accomplished in the preferred embodiment by employment of a second clutch between the drive means and the reel drive elements which differentially compares the speed of the reel drive elements to a fractional portion of the speed of the drive means corresponding to the slowest speed at which the reel drive elements should run during the normal playback or record operation. When the ratio of these speeds falls below unity, the second clutch couples the drive means directly to the reel drive elements, creating a spatial shift of the reel drive elements to trip an actuator controlling the energy source for the transport in a manner hereinafter described.

The primary embodiment of the invention is shown in FIGS. 2–5, with elements common to those in FIG. 1 being referenced with the same numbers as shown in FIG. 1.

Figure 2:
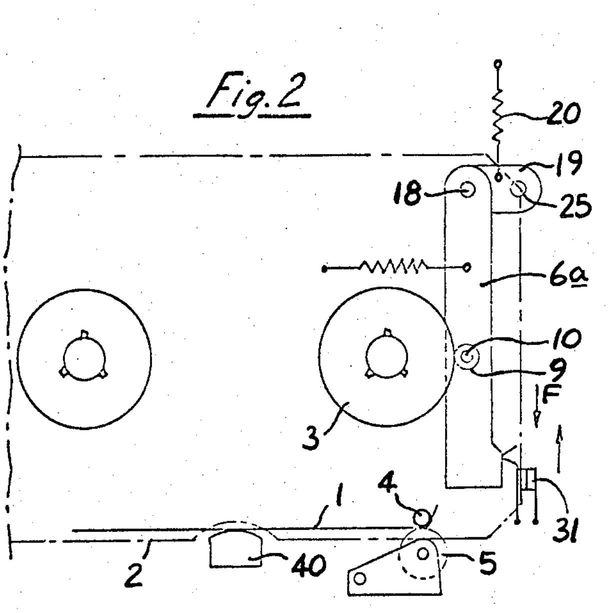
FIGS. 2 and 3 are diagrammatic views, showing two operative positions, of a take-up reel drive constructed in accordance with the present invention.

This embodiment differs from the conventional arrangement shown in FIG. 1 in that the single arm 6 pivoting on the spindle 7 (FIG. 1) is replaced by an articulated assembly including two arms *6a*, 19 connected by a pin 18 and disposed for pivotable movement about a pivot 25 projecting from the transport. A spring 20 biases the assembly toward its uppermost position as shown in FIG. 2. The reel drive elements supported by the arm *6a* include the spindle 7 having the roller 9 mounted on its upper end and having a clutch plate 26 mounted at its lower end. A sleeve shaped member 27 is secured to the spindle 7 and forms an engaging surface of a second clutch to be described.

Figure 3:
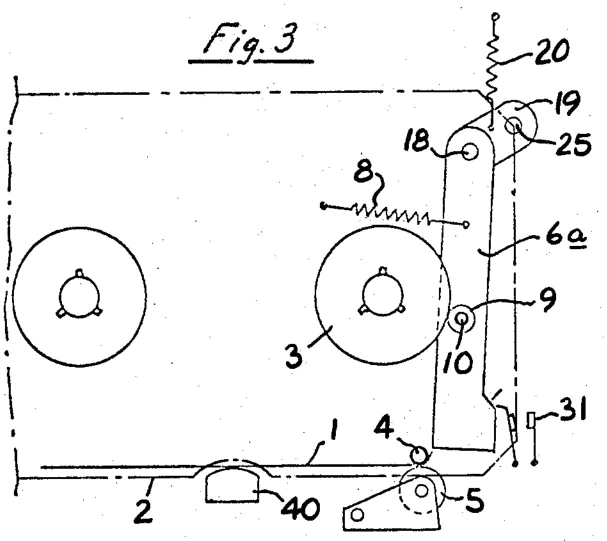
Figure 5:
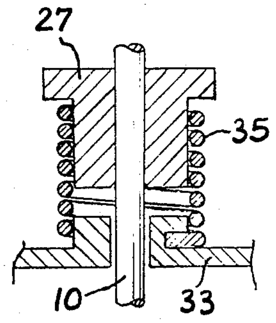
FIG. 5 is an enlarged sectional view of the spring clutch mechanism shown in FIG. 4.

The drive means shown in FIGS. 2–5 differs from that shown in FIG. 1 in that the belt 12 additionally drives the capstan 4 via a pulley 28 mounted thereon, the capstan 4 being additionally provided with a fly wheel 29 and cooperating with the pressure roller 5 to drive the tape. The motive force of the drive means is provided by a motor 30 driving the shaft 16 on which the pulley 15 is mounted for engagement with the belt 12. Electrical energy is supplied to the motor from a source (not shown) through an actuator in the form of a normally closed switch 31 disposed at the lower end of the arm *6a* and cooperating with a cam surface on the arm to facilitate opening of the switch when the arm *6a* is in its lower position as shown in FIG. 3.

For the purpose of providing a slippable connection between the drive means and the reel drive elements, the pulley 11 has a lower surface forming a clutch face and cooperating with a friction lining 32 to complete a non-rigid connection with the plate 26 for driving the reel drive elements. As noted above, the difference in speed between the reel 3 and the drive means is absorbed in the slippage of the clutch faces about the lining 32.

A second clutch arrangement is provided at the top of the pulley 11 consisting of step down gearing 33, 34 and a coil spring 35. Like the pulley 11, the gear 33 rotates freely about the spindle 10, but the gear 33 rotates at a fractional portion of the speed of the pulley 11, corresponding to the lowest rotational speed of the sleeve shaped member 27 during normal forward playback by the transport. The coil spring 35 is fixed at one end to the gear 25 and has a hand such that it rolls around the member 27 and slips with a slight friction when the member 27 turns in its forward direction more rapidly than the spring 35, which rotates with the gear 33. When the spindle 10 and the member 27 turn in that direction less rapidly than the spring 35, and particularly when the tape stops and the spindle 10 is no longer driven by the friction lining, the spring 35 will lock on the member 27 secured to the spindle 10 to provide a direct engagement between the drive means and the reel drive elements in a manner illustrated by FIG. 5.

During normal forward operation, the arm 6 is pivoted to its upward position as shown in FIG. 2, and the actuator switch 31 controlling the flow of energy to the motor 30 is closed. The take-up reel 3 is driven by the roller 9 through the first clutch from the pulley 11, the slippage on the clutch friction lining 32 increasing as the speed of the reel 3 decreases due to accumulation of tape on the reel. So long as the take-up reel 3 can be driven at a greater speed than its lowest normal speed, the drive continues through the first clutch. During this period, the member 27 secured to the spindle 10 rotates more quickly than the assembly 33–35, and the turns of the spring 35 tend to open, offering only a very slight friction between the member 27 and the second clutch assembly 33, 34, 35.

When the reel 3 stops, indicating the end of the recording or playback of the tape 1, the gear 33 continues to rotate the spring 35 in the direction of the hand of the spring turns but the frictional force between the sleeve 27 and the inside of the spring 35 applies torque to the spring 35 in the direction tending to tighten its coils about the sleeve 27 to complete a direct connection between the pulley 11 of the drive means and the reel drive elements. Because the reel 3 is stopped, the roller 9 riding on the periphery thereof overcomes the bias of the spring 20 and rocks the entire arm assembly 6, 19 in the direction of the arrow F so that the lever arm 6 occupies the position shown in FIG. 3 and the elements associated with this lever occupy their corresponding positions. The downward motion of the lever arm 6 allows the actuator switch 31 to open, disconnecting the drive means from its energy source and rendering the transport inoperative.

Figure 6:
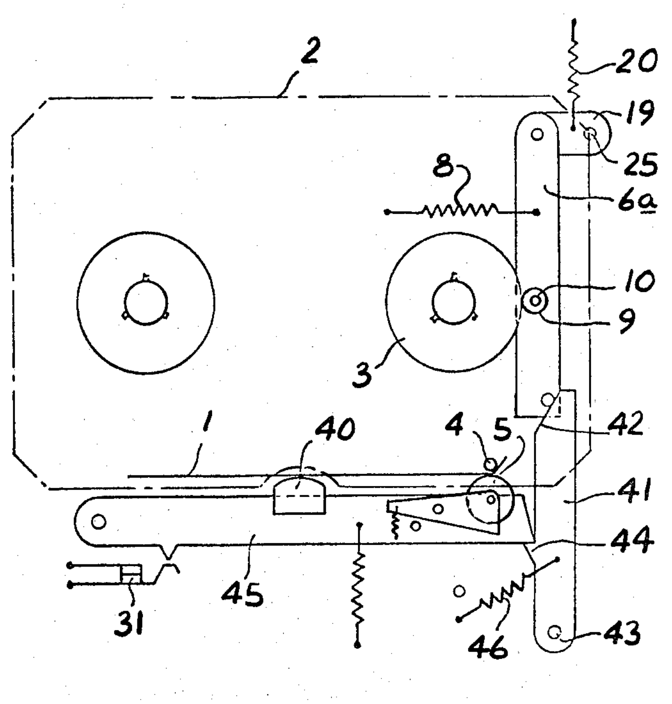
FIGS. 6 and 7 are diagrammatic views of a second embodiment of the present invention.
Figure 7:
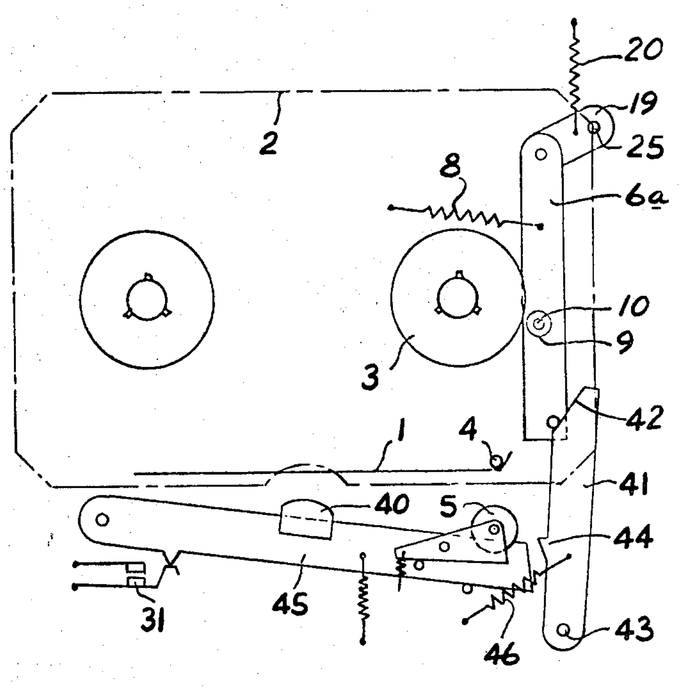

A modified form of the invention is shown in the embodiment of FIGS. 6 and 7, in which there is provided additional linkage for retracting the operative elements, including a playback head 40 and the roller 5, of the transport in response to the direct coupling of the drive means to the reel drive elements. As illustrated, the lever 6 acts on an intermediate member 41 via a cam surface 42 carried thereby to rotate the lever 41 about its pivot point 43. A projection 44 borne by the member 41 cooperates with a lever 45 bearing the pressure roller 5, the playback or record head 40 and a projection for actuating the switch 31. The intermediate member 44 is normally biased by a spring 46 to hold the playback elements into engagement with the tape 1.

In operation, the downward movement of the lever 6 in response to the decrease in speed of the take-up reel below a predetermined speed, such as occurs when the take-up reel slows to a stop at the end of the tape, causes the intermediate member 41 to rock in a clockwise direction about the spindle 43 and thereby releases the lever 45 (FIG. 7), opening the actuator switch 31 and placing operative elements of the transport in their inoperative positions. The power to the drive means is thereby disconnected.

Various known methods may be used to return the system to the operative position, the particular configuration depending upon the characteristics of the transport in which this take-up control is employed.

I claim as may invention:

1. In a tape transfer system for winding tape from a supply reel to a take-up reel, the combination comprising
- an energy source,
- drive means normally connected to said energy source to operate at a fixed speed,
- take-up reel drive elements
- slippable clutch means coupling said drive means to said take-up reel drive elements for normal operation of the reel at speeds which decrease as additional tape is wound on the reel, and
- means operative in response to a drop in speed of said reel drive elements by a predetermined amount below the fixed speed of said drive means for directly coupling said drive means to disconnect said energy source from said drive means.

2. In a tape transfer system for winding tape from a supply reel to a take-up reel, the combination comprising
- an energy source,
- drive means normally connected through an actuator to said energy source to operate at a fixed speed,
- take-up reel drive elements,
- slippable clutch means coupling said drive means to said take-up reel drive elements for normal operation of the reel at speeds which decrease as additional tape is wound on the reel, and
- means operative in response to a drop in speed of said reel drive elements by a predetermined amount below the fixed speed of said drive means for directly coupling said drive means to move said actuator to disconnect said energy source from said drive means.

3. In a tape transport device for winding tape onto a take-up reel, said transport having operative elements for tape drive, recording and playback adapted for selective engagement with the tape, the combination comprising
- an energy source,
- drive means normally connected to said energy source and operating at a fixed speed in response thereto,
- take-up reel drive elements,
- slippable clutch means coupling said drive means to said take-up reel drive elements for normal operation of the reel at speeds which decrease as additional tape is wound on the reel, and
- means operative in response to a drop in speed of said reel drive elements by a predetermined amount below the fixed speed of said drive means for directly coupling said drive means to bring at least one of said operative elements of the transport into its inoperative position.

4. In a tape transport device, the combination according to claim 3 including additional means responsive to the direct coupling of said drive means to disconnect said energy source from said drive means.

5. In a tape transport device for winding tape onto a take-up reel, the combination comprising
- an energy source,
- drive means normally coupled to said energy source and operating at a selected speed in response thereto,
- shiftably mounted take-up reel drive elements,
- a first clutch slippably coupling said drive means to said reel drive elements for normal operation of the reel at speeds which decrease as additional tape is wound on reel,
- a second clutch for directly coupling said drive means and said reel drive elements in response to a drop in speed of said reel drive elements by a predetermined amount below the speed of said drive means, said direct coupling creating a spacial shift of said reel drive elements by said drive means, and
- means responsive to the spacial shift of said reel drive elements for disconnecting said energy source from said drive means.

6. In a tape transport device, the combination according to claim 5, including resilient means biasing said shiftably mounted take-up reel drive elements to a first position for normal operation of said reel drive elements, said direct coupling being operable to spacially shift said reel drive elements against the bias of said resilient means.

7. In a tape transport device, the combination according to claim 5 wherein said second clutch includes a coil spring disposed between said drive means and said reel drive elements and adapted a. for slippable engagement with said reel drive elements during driving of said take up reel above a predetermined speed and b. for direct engagement with said reel drive elements when said reel is driven at a speed below said predetermined speed to thereby produce said direct coupling of said drive means to said reel drive elements.

8. In a tape transport device, the combination according to claim 7 in which said predetermined reel speed is the lowest reel speed which can be expected during normal forward operation of the transport.

9. In a tape transport device, the combination according to claim 5 wherein said second clutch includes speed reduction gearing driven by said drive means at a rotational speed below the lowest speed of said take-up reel drive elements during normal forward operation, and means responsive to a drop in the speed of said reel drive elements below the speed of said reduction gearing for producing said direct coupling of said reel drive elements to said drive means.

* * * * *